United States Patent
Wilson

(10) Patent No.: US 9,336,804 B2
(45) Date of Patent: May 10, 2016

(54) SYSTEMS AND METHODS FOR MULTI-RESOLUTION DATA SENSING

(71) Applicant: LSI Corporation, San Jose, CA (US)

(72) Inventor: Bruce A. Wilson, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/028,386

(22) Filed: Sep. 16, 2013

(65) Prior Publication Data
US 2015/0055249 A1    Feb. 26, 2015

Related U.S. Application Data

(60) Provisional application No. 61/869,643, filed on Aug. 23, 2013.

(51) Int. Cl.
G11B 5/012    (2006.01)
G11B 5/265    (2006.01)
G11B 5/39    (2006.01)
G11B 5/48    (2006.01)
G11B 20/10    (2006.01)

(52) U.S. Cl.
CPC .............. *G11B 5/4886* (2013.01); *G11B 5/012* (2013.01); *G11B 5/2652* (2013.01); *G11B 5/3954* (2013.01); *G11B 20/10018* (2013.01)

(58) Field of Classification Search
CPC ..................................................... G11B 5/2652
See application file for complete search history.

(56) References Cited

U.S. PATENT DOCUMENTS

| | | | |
|---|---|---|---|
| 5,790,334 A * | 8/1998 | Cunningham | 360/66 |
| 6,157,510 A * | 12/2000 | Schreck et al. | 360/77.06 |
| 7,259,927 B2 * | 8/2007 | Harris | 360/48 |
| 8,139,301 B1 * | 3/2012 | Li et al. | 360/39 |
| 8,638,513 B1 * | 1/2014 | Burd | 360/39 |
| 8,913,345 B1 * | 12/2014 | Behrens | 360/110 |
| 2014/0063644 A1 * | 3/2014 | Lou et al. | 360/75 |

* cited by examiner

Primary Examiner — Daniell L Negron

(57) ABSTRACT

Systems and methods relating generally to sensing information, and more particularly to systems and methods for utilizing multiple readers to sense information.

26 Claims, 4 Drawing Sheets

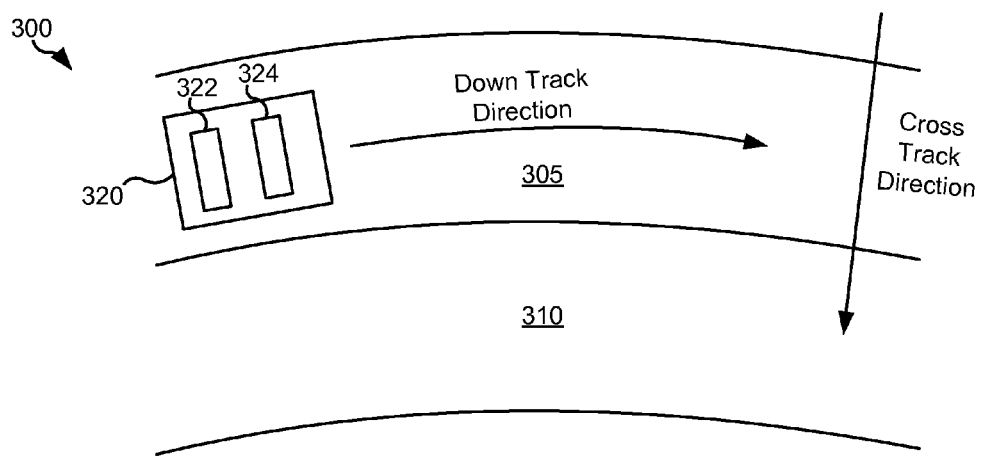
Fig. 3a
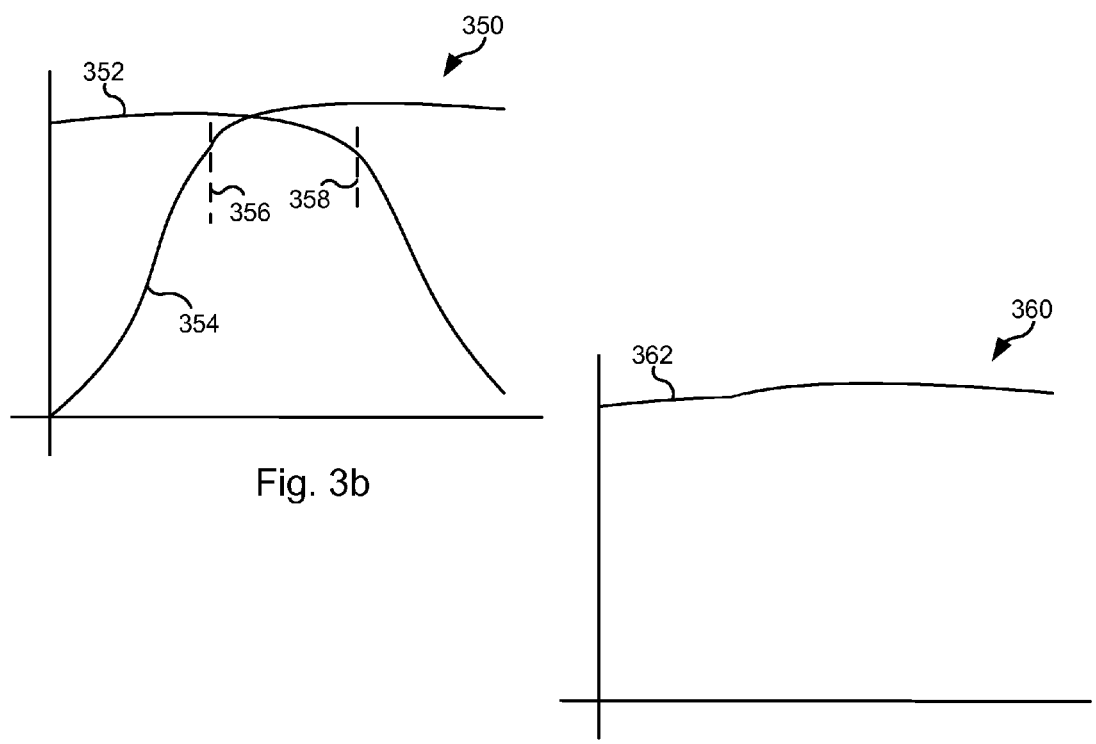
Fig. 3b
Fig. 3c

SYSTEMS AND METHODS FOR MULTI-RESOLUTION DATA SENSING

CROSS REFERENCE TO RELATED APPLICATIONS

The present application claims priority to (is a non-provisional of) U.S. Pat. App. No. 61/869,643 entitled "Systems and Methods for Multi-Resolution Data Sensing", and filed Aug. 23, 2013 by Wilson et al. The entirety of the aforementioned provisional patent application is incorporated herein by reference for all purposes.

FIELD OF THE INVENTION

Systems and methods relating generally to sensing information, and more particularly to systems and methods for utilizing multiple readers to sense information.

BACKGROUND

Typical storage devices include an ability to store and retrieve information from a storage medium. This storage and retrieval includes writing data to the storage medium, and sensing data previously written to the storage medium. In some cases, the sensing is not accurate and results in data errors.

Hence, for at least the aforementioned reasons, there exists a need in the art for advanced systems and methods for data processing.

SUMMARY

Systems and method relating generally to sensing information, and more particularly to systems and methods for utilizing multiple readers to sense information.

Some embodiments of the present invention provide head assemblies. The head assemblies include: a first sensor exhibiting a first resolution, and a second sensor exhibiting a second resolution. In some instances of the aforementioned embodiments, the first resolution is a low resolution and the second resolution is a high resolution, the low resolution exhibits a transfer function that is low-pass in nature, and the high resolution exhibits a transfer function that is high-pass in nature.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3a shows the head of one of FIGS. 2a-2c in relation to a storage medium including tracks;

FIG. 3b is a graphic showing the frequency response of the first sensor and the frequency response of the second sensor, where the first sensor is a low pass sensor and the second sensor is a high pass sensor in accordance with some embodiments of the present invention;

FIG. 3c is a graphic showing a combination of frequency response of the first sensor and the second sensor.

DETAILED DESCRIPTION OF SOME EMBODIMENTS

Figure 1:
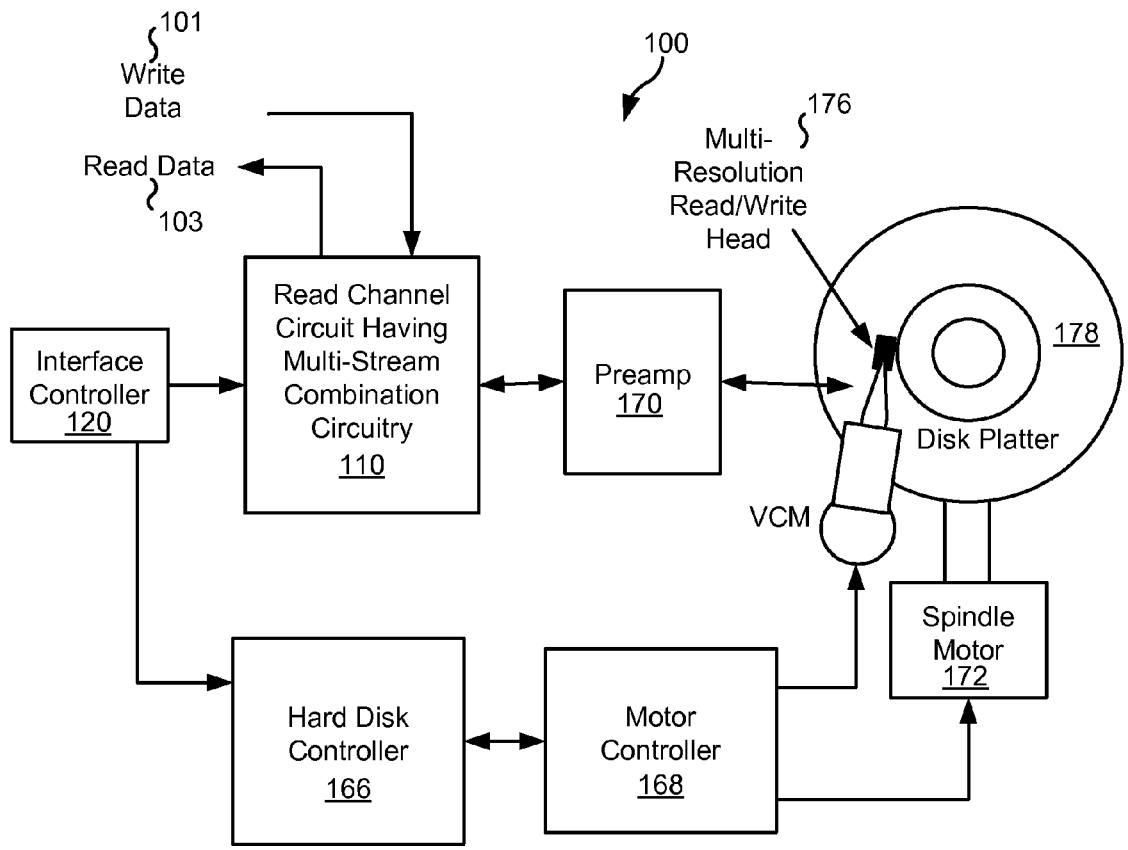
FIG. 1 shows a storage system including a multi-resolution read/write head assembly and read channel circuitry having multi-stream combination circuitry in accordance with various embodiments of the present invention.

Systems and methods relating generally to sensing information, and more particularly to systems and methods for utilizing multiple readers to sense information.

Various embodiments of the present invention provide hard disk drives that include: a disk platter, a head assembly, and a read circuit. The disk platter includes a track of information. The head assembly is disposed in relation to the disk platter. The head assembly includes at least a first sensor and a second sensor, where the first sensor exhibits a first resolution and the second sensor exhibits a second resolution. The read circuit is operable to receive a first signal from the first sensor and a second signal from the second sensor, and to combine the first signal and the second signal to yield a unified data output. In some instances, the read circuit is implemented as part of an integrated circuit.

In some instances of the aforementioned embodiments, both the first sensor and the second sensor sense the information from the track. In various instances of the aforementioned embodiments, the disk platter is a magnetic storage medium, and the information is magnetic information. In one or more instances of the aforementioned embodiments, the head assembly is operable to move in relation to the disk platter in a down track direction, and a cross track direction is substantially perpendicular to the down track direction. In some such cases, the first sensor is offset to the right of the second sensor in the cross track direction. In other such cases, the first sensor is offset to the left of the second sensor in the cross track direction. In yet other such cases, the first sensor is aligned with the second sensor in the cross track direction.

In various instances of the aforementioned embodiments, the first resolution is lower than the second resolution. In some instances of the aforementioned embodiments, the first resolution is a low resolution and wherein the second resolution is a high resolution, the low resolution exhibits a transfer function that is low-pass in nature, and the high resolution exhibits a transfer function that is high-pass in nature. In some such cases, the first sensor leads the second sensor in the down track direction. In other such cases, the second sensor leads the first sensor in the down track direction.

Other embodiments of the present invention provide head assemblies. The head assemblies include: a first sensor exhibiting a first resolution, and a second sensor exhibiting a second resolution. In some instances of the aforementioned embodiments, the first resolution is a low resolution and the second resolution is a high resolution, the low resolution exhibits a transfer function that is low-pass in nature, and the high resolution exhibits a transfer function that is high-pass in nature. It should be noted that while the low resolution may be implied as being associated with the low pass frequency response, and the high resolution may be implied as being associated with the high pass frequency response, that each may also be interpreted in terms of T50 of the isolated transition response of the head. T50 refers generally to the time required for the transition response to rise from −50% to +50% of a saturation amplitude. In terms of T50, low-resolution refers to high T50 and high-resolution refers to Low T50. High T50 head has a frequency response that is low-pass in nature while the low-T50 head has a frequency response that has much wider bandwidth thereby covering much higher frequencies. In some cases, the head assembly is disposable over a track of a storage medium. In such cases, a down track direction is a direction the head assembly moves in relation to the storage medium during an access of the storage medium, and the physical layout of the first sensor and the second sensor is either the first sensor leads the second sensor in the down track direction, or the second sensor leads the first sensor in the down track direction.

In one or more instances of the aforementioned embodiments, the first sensor is separated in a horizontal direction by a shield. In other instances, the first sensor is offset to the left of the second sensor in a vertical direction, where the vertical direction is substantially perpendicular to the horizontal direction. In various instances, the first sensor is offset to the right of the second sensor in a vertical direction, where the vertical direction is substantially perpendicular to the horizontal direction. In particular instances, the first sensor is aligned with the second sensor in a vertical direction, where the vertical direction is substantially perpendicular to the horizontal direction.

Turning to FIG. 1, a storage system 100 is shown that includes a multi-resolution read/write head assembly and read channel circuitry having multi-stream combination circuitry in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a multi-resolution read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, multi-resolution read/write head 176 is accurately positioned by motor controller 168 over a desired data track on disk platter 178. Motor controller 168 both positions multi-resolution read/write head 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once multi-resolution read/write head 176 is positioned adjacent the proper data track, magnetic signals representing data on disk platter 178 are sensed by multi-resolution read/write head 176 as disk platter 178 is rotated by spindle motor 172. The sensed magnetic signals are provided as a continuous, minute analog signal representative of the magnetic data on disk platter 178. This minute analog signal is transferred from multi-resolution read/write head 176 to read channel circuit 110 via preamplifier 170. Preamplifier 170 is operable to amplify the minute analog signals accessed from disk platter 178. In turn, read channel circuit 110 digitizes and decodes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

Multi-resolution read/write head 176 includes two or more sensors that each exhibit a different sensing resolution. The sensors pass over the same track on disk platter 178, and the sensed signal from each of the sensors is passed to preamplifier 170 where the respective signals are amplified before being provided to read channel circuit 110. Read channel circuit 110 converts the signals into respective series of digital samples which are equalized to yield respective series of equalized data sets. The equalized data sets are then combined to make a unified data output that is processed to recover data originally written to disk platter 178. In some embodiments of the present invention, multi-resolution read/write head 176 may be implemented similar to that discussed below in relation to FIGS. 2a-2c, and read channel circuit 110 may include circuitry similar to that discussed below in relation to FIG. 4.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2A:
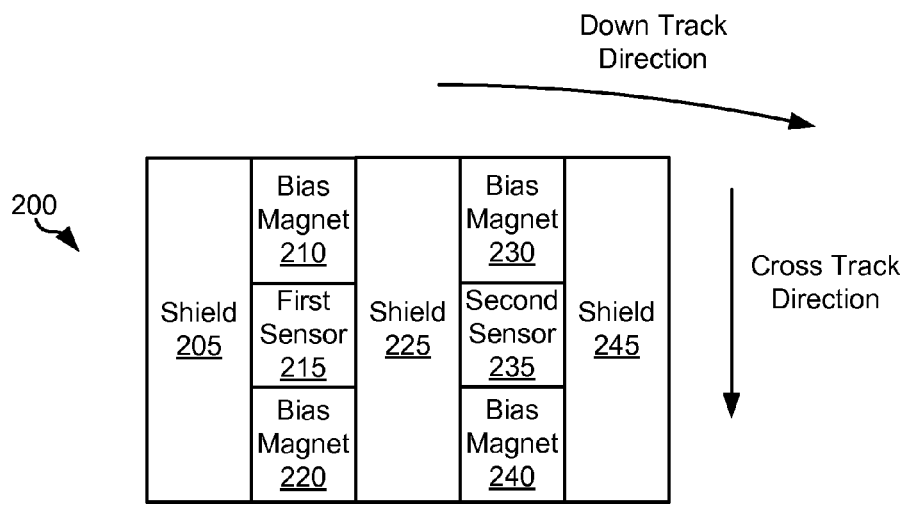
FIG. 2a depicts a head assembly including a first sensor having a first resolution and a second sensor having a second resolution in accordance with some embodiments of the present invention.

Turning to FIG. 2a, one example of a head assembly 200 including a first sensor 215 having a first resolution and a second sensor 235 having a second resolution is shown in accordance with some embodiments of the present invention. Head assembly 200 includes first sensor 215 flanked in a cross track direction by a bias magnet 210 and a bias magnet 220; and second sensor 235 flanked in the cross track direction by a bias magnet 230 and a bias magnet 240. First sensor 215 is flanked in a down track direction by a shield 205 and a shield 225; and second sensor 235 is flanked in the down track direction by shield 225 and a shield 245. The shields may be, but are not limited to a region that may be either electrically charged or electrically neutral and serve the purposes of shielding first sensor 215 and second sensor 235 from interference.

First sensor 215 is selected to offer a different resolution or operative capability than second sensor 235. In one particular embodiment of the present invention, second sensor 235 is selected to have a low resolution relative to that of first sensor 215. As used herein, the phrase "low resolution sensor" is used in its broadest sense to mean any sensor that exhibits a transfer function that is low-pass in nature. The cut-off frequency of the low resolution sensor may be selected to be very low in the range of, for example, 1 KHz. Based upon the disclosure provided herein, one of ordinary skill in the art will recognize a variety of cut-off frequencies that may be selected for second sensor 235. In contrast, first sensor 215 is selected to have a high resolution relative to that of second sensor 235. As used herein, the phrase "high resolution sensor" mean any sensor that exhibits a transfer function that is high-pass in nature. The cut-off frequency of the high resolution sensor may be selected to be very high in the range of, for example, 1 GHz. Based upon the disclosure provided herein, one of ordinary skill in the art will recognize a variety of cut-off frequencies that may be selected for first sensor 215. In various embodiments of the present invention, the cut-off freq of low resolution sensor should be similar to the cut-off frequency of the high resolution sensor, so that they can together cover a complete range.

Use of a low resolution sensor (in this embodiment, second sensor 235) ensures sufficient signal to noise ratio available to read back low to mid-frequencies. In contrast, use of a high resolution sensor (in this embodiment, second sensor 215) ensures sufficient signal to noise ratio available to read back mid to high-frequencies. Frequency selectivity achieved through using sensors exhibiting different frequency characteristics is beneficial in reducing the effects of local squeeze that happens during the write process due to track mis-registration. Such track squeeze tends to decrease the normalized channel bit density upon read back of previously written data. This results in increased energy in the high frequency region. A high resolution sensor having sensitivities to the higher frequencies is thus helpful to boosting signal to noise ratio where track squeeze is evident.

In head assembly 200, first sensor 215 and second sensor 235 are substantially aligned (exhibit near zero offset) in the cross-track direction. Such alignment of first sensor 215 and second sensor 235 in the cross-track direction helps in minimizing the effect of skew that occurs as a result of differing circumference of the inner diameter and outer diameter of the disk platter accessed by head assembly 200. Such alignment assumes zero skew at a mid-diameter. Based upon the assumption, such alignment of first sensor 215 and second sensor 235 helps to assure that both of the sensors are reading the same track regardless of whether head assembly 200 is near the inner diameter or the outer diameter, if the separation between first sensor 215 and second sensor 235 in down track direction is sufficiently small so as not cause significant cross-track spacing between the sensors at inner or outer diameters of the disk platter because of skew.

While head assembly 200 is discussed as having two sensors, read heads having three or more sensors are possible in accordance with other embodiments of the present invention. For example, a medium resolution sensor may be included in addition to first sensor 215 and second sensor 235. This medium resolution sensor may have a transfer function that is band pass in nature with lower cut-off frequency similar to or not exceeding the cut-off frequency of second sensor 235 and higher cut-off frequency similar to or higher than the cut-off frequency of first sensor 215. Further, it should be noted that while the preceding embodiment described second sensor 235 as a low resolution sensor and first sensor 215 as a high resolution sensor, in other embodiments of the present invention, second sensor 235 may be a high resolution sensor and sensor 215 may be a low resolution sensor. Further, either or both of first sensor 215 and/or second sensor 235 may be replaced with a medium resolution sensor. Where both first sensor 215 and second sensor 235 are replaced by medium resolution sensors, the cut-off frequencies for the two sensors are selected to be substantially different to assure enhanced coverage.

Figure 2B:
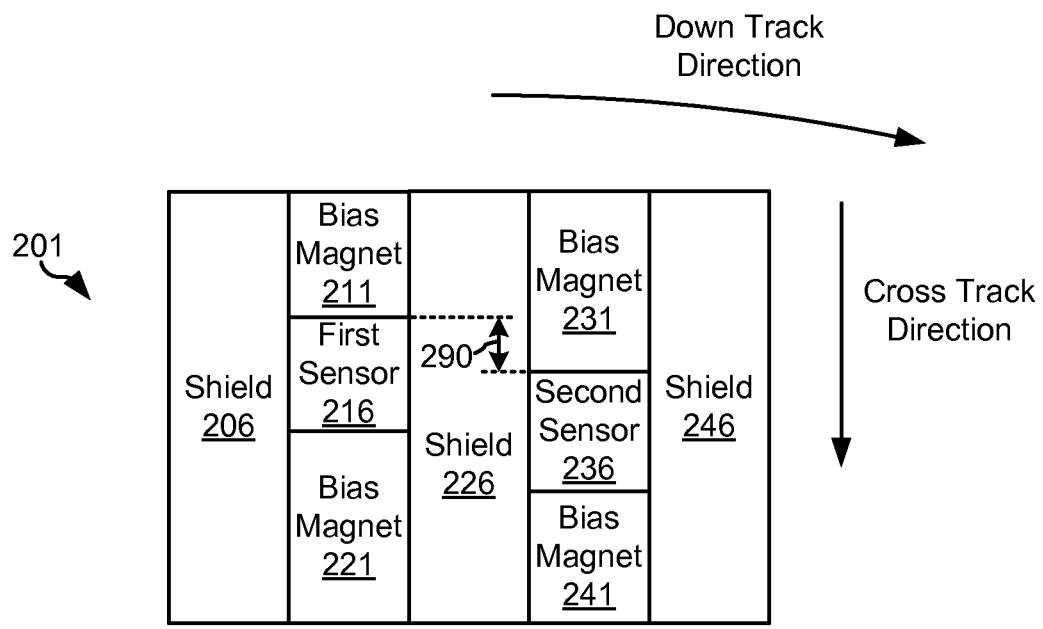
FIG. 2b depicts a head assembly including a first sensor having a first resolution and a second sensor having a second resolution where the first sensor is offset to the left of the second sensor in the cross track direction in accordance with various embodiments of the present invention.

Turning to FIG. 2b, another example of a head assembly 201 including a first sensor 216 having a first resolution and a second sensor 236 having a second resolution where the first sensor is offset 290 to the left of the second sensor in the down track direction is shown in accordance with various embodiments of the present invention. Head assembly 201 includes first sensor 216 flanked in a cross track direction by a bias magnet 211 and a bias magnet 221; and second sensor 236 flanked in the cross track direction by a bias magnet 231 and a bias magnet 241. First sensor 216 is flanked in a down track direction by a shield 206 and a shield 226; and second sensor 236 is flanked in the down track direction by shield 226 and a shield 246. The shields may be, but are not limited to a region that may be either electrically charged or electrically neutral and serve the purposes of shielding first sensor 216 and second sensor 236 from interference.

First sensor 216 is selected to offer a different resolution or operative capability than second sensor 236. In one particular embodiment of the present invention, second sensor 236 is selected to have a low resolution relative to that of first sensor 216. As used herein, the phrase "low resolution sensor" may mean any sensor that exhibits a transfer function that is low-pass in nature. The cut-off frequency of the low resolution sensor may be selected to be very low in the range of, for example, 1 KHz. Based upon the disclosure provided herein, one of ordinary skill in the art will recognize a variety of cut-off frequencies that may be selected for second sensor 236. In contrast, first sensor 216 is selected to have a high resolution relative to that of second sensor 236. As used herein, the phrase "high resolution sensor" is used in its broadest sense to mean any sensor that exhibits a transfer function that is high-pass in nature. The cut-off frequency of the high resolution sensor may be selected to be very high in the range of, for example, 1 GHz. Based upon the disclosure provided herein, one of ordinary skill in the art will recognize a variety of cut-off frequencies that may be selected for first sensor 216. In various embodiments of the present invention, the cut-off freq of low resolution sensor should be similar to the cut-off frequency of the high resolution sensor, so that they can together cover a complete range.

Use of a low resolution sensor (in this embodiment, second sensor 236) ensures sufficient signal to noise ratio available to read back low to mid-frequencies. In contrast, use of a high resolution sensor (in this embodiment, second sensor 216) ensures sufficient signal to noise ratio available to read back mid to high-frequencies. Frequency selectivity achieved through using sensors exhibiting different frequency characteristics is beneficial in reducing the effects of local squeeze that happens during the write process due to track mis-registration. Such track squeeze tends to decrease the normalized channel bit density upon read back of previously written data. This results in increased energy in the high frequency region. A high resolution sensor having sensitivities to the higher frequencies is thus helpful to boosting signal to noise ratio where track squeeze is evident.

In head assembly 201, first sensor 216 and second sensor 236 are purposely offset 290 in the cross-track direction. Such mis-alignment of first sensor 216 and second sensor 236 in the cross-track direction helps in minimizing the effect of skew that occurs as a result of differing circumference of the inner diameter and outer diameter of the disk platter accessed by head assembly 201. Such mis-alignment assumes non-zero skew at a mid-diameter. Such an alignment helps to reduce the effect of skew at the inner diameter. To assure that both of the sensors are reading the same track regardless of whether head assembly 201 is near the inner diameter or the outer diameter, the separation between first sensor 216 and second sensor 236 in down track direction should be sufficiently small so as not cause significant increase in cross-track spacing between the sensors at inner or outer diameters of the disk platter because of skew.

While head assembly 201 is discussed as having two sensors, read heads having three or more sensors are possible in accordance with other embodiments of the present invention. For example, a medium resolution sensor may be included in addition to first sensor 216 and second sensor 236. This medium resolution sensor may have a transfer function that is band pass in nature with lower cut-off frequency similar to or not exceeding the cut-off frequency of second sensor 236 and higher cut-off frequency similar to or higher than the cut-off frequency of first sensor 216. Further, it should be noted that while the preceding embodiment described second sensor 236 as a low resolution sensor and first sensor 216 as a high resolution sensor, in other embodiments of the present invention, second sensor 236 may be a high resolution sensor and sensor 216 may be a low resolution sensor. Further, either or both of first sensor 216 and/or second sensor 236 may be replaced with a medium resolution sensor. Where both first sensor 216 and second sensor 236 are replaced by medium resolution sensors, the cut-off frequencies for the two sensors are selected to be substantially different to assure enhanced coverage.

Figure 2C:
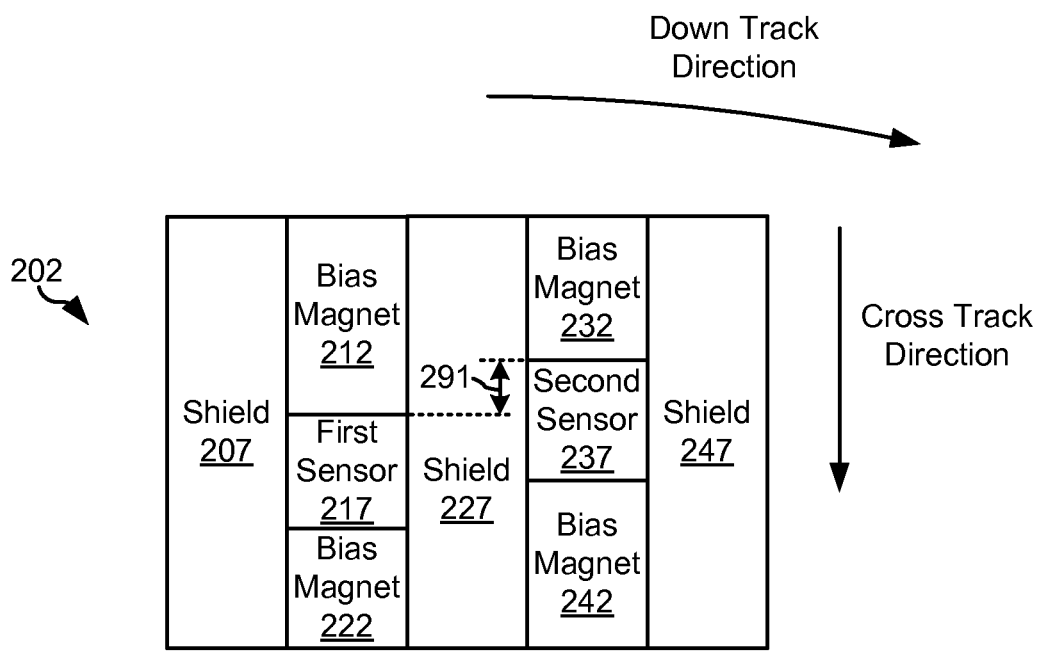
FIG. 2c depicts a head assembly including a first sensor having a first resolution and a second sensor having a second resolution where the first sensor is offset to the right of the second sensor in the cross track direction in accordance with various embodiments of the present invention.

Turning to FIG. 2c, yet another example of a head assembly 202 including a first sensor 217 having a first resolution and a second sensor 237 having a second resolution where the first sensor is offset 291 to the right of the second sensor in the down track direction is shown in accordance with various embodiments of the present invention. Head assembly 202 includes first sensor 217 flanked in a cross track direction by a bias magnet 212 and a bias magnet 222; and second sensor 237 flanked in the cross track direction by a bias magnet 232 and a bias magnet 242. First sensor 217 is flanked in a down track direction by a shield 207 and a shield 227; and second sensor 237 is flanked in the down track direction by shield 227 and a shield 247. The shields may be, but are not limited to a region that may be either electrically charged or electrically neutral and serve the purposes of shielding first sensor 217 and second sensor 237 from interference.

First sensor 217 is selected to offer a different resolution or operative capability than second sensor 237. In one particular embodiment of the present invention, second sensor 237 is selected to have a low resolution relative to that of first sensor 217. As used herein, the phrase "low resolution sensor" is used in its broadest sense to mean any sensor that exhibits a transfer function that is low-pass in nature. The cut-off frequency of the low resolution sensor may be selected to be very low in the range of, for example, 1 KHz. Based upon the disclosure provided herein, one of ordinary skill in the art will recognize a variety of cut-off frequencies that may be selected for second sensor 237. In contrast, first sensor 217 is selected to have a high resolution relative to that of second sensor 237. As used herein, the phrase "high resolution sensor" is used in its broadest sense to mean any sensor that exhibits a transfer function that is high-pass in nature. The cut-off frequency of the high resolution sensor may be selected to be very high in the range of, for example, 1 GHz. Based upon the disclosure provided herein, one of ordinary skill in the art will recognize a variety of cut-off frequencies that may be selected for first sensor 217. In various embodiments of the present invention, the cut-off freq of low resolution sensor should be similar to the cut-off frequency of the high resolution sensor, so that they can together cover a complete range.

Use of a low resolution sensor (in this embodiment, second sensor 237) ensures sufficient signal to noise ratio available to read back low to mid-frequencies. In contrast, use of a high resolution sensor (in this embodiment, second sensor 217) ensures sufficient signal to noise ratio available to read back mid to high-frequencies. Frequency selectivity achieved through using sensors exhibiting different frequency characteristics is beneficial in reducing the effects of local squeeze that happens during the write process due to track mis-registration. Such track squeeze tends to decrease the normalized channel bit density upon read back of previously written data. This results in increased energy in the high frequency region.

A high resolution sensor having sensitivities to the higher frequencies is thus helpful to boosting signal to noise ratio where track squeeze is evident.

In head assembly 202, first sensor 217 and second sensor 237 are purposely offset 291 in the cross-track direction. Such mis-alignment of first sensor 217 and second sensor 237 in the cross-track direction helps in minimizing the effect of skew that occurs as a result of differing circumference of the inner diameter and outer diameter of the disk platter accessed by head assembly 202. Such mis-alignment assumes non-zero skew at a mid-diameter. This alignment helps to minimize the effect of skew at the outer diameter. To assure that both of the sensors are reading the same track regardless of whether head assembly 202 is near the inner diameter or the outer diameter, the separation between first sensor 217 and second sensor 237 in down track direction should be sufficiently small so as not cause significant increase in cross-track spacing between the sensors at inner or outer diameters of the disk platter because of skew.

While head assembly 202 is discussed as having two sensors, read heads having three or more sensors are possible in accordance with other embodiments of the present invention. For example, a medium resolution sensor may be included in addition to first sensor 217 and second sensor 237. This medium resolution sensor may have a transfer function that is band pass in nature with lower cut-off frequency similar to or not exceeding the cut-off frequency of second sensor 237 and higher cut-off frequency similar to or higher than the cut-off frequency of first sensor 217. Further, it should be noted that while the preceding embodiment described second sensor 237 as a low resolution sensor and first sensor 217 as a high resolution sensor, in other embodiments of the present invention, second sensor 237 may be a high resolution sensor and sensor 217 may be a low resolution sensor. Further, either or both of first sensor 217 and/or second sensor 237 may be replaced with a medium resolution sensor. Where both first sensor 217 and second sensor 237 are replaced by medium resolution sensors, the cut-off frequencies for the two sensors are selected to be substantially different to assure enhanced coverage.

Turning to FIG. 3a, a head 320 is shown in relation to tracks 305, 310 of a storage medium 300. Head 320 may be implemented similar to any of the heads discussed above in relation to FIGS. 2a-2c. As shown, storage medium 300 includes two tracks 305, 310 over which head 320 flies. Head 320 includes a first sensor 322 and a second sensor 324 both reading the same track 305. Information sensed by both sensors is transferred to a processing circuit. FIG. 3b is a graphic 350 showing a frequency response 354 of first sensor 322 and a frequency response 352 of sensor 324. As shown, frequency response 354 is a high pass transfer function with a cutoff frequency 356, and frequency response 352 is a low pass transfer function with a cutoff frequency 358. FIG. 3c is a graphic 360 that shows a combination of frequency response 352 and frequency response 354 as a combined frequency response 362.

Figure 4:
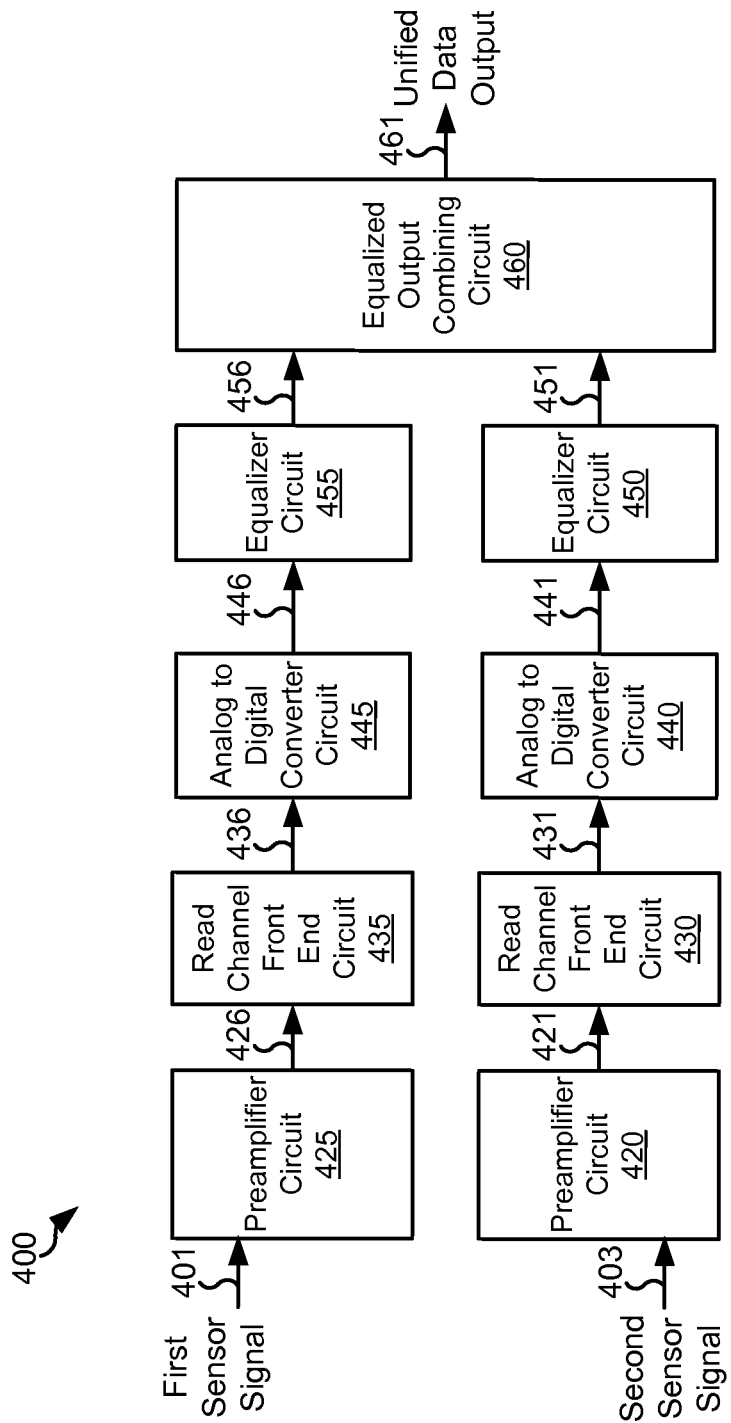
FIG. 4 shows a multi-stream combination circuit in accordance with some embodiments of the present invention.

FIG. 4 shows a multi-stream combination circuit 400 in accordance with some embodiments of the present invention. Multi-stream combination circuit 400 receives a first sensor signal 401 (from first sensor 322) and a second sensor signal 403 (from second sensor 324). First sensor signal 401 is amplified by a preamplifier circuit 425 to yield an amplified output 426. Amplified output 426 is amplified by a read channel analog front-end 435 to yield an analog front-end output 436. Analog front end output 436 is converted to a first series of digital samples 446 by an analog to digital converter circuit 445. The first series of digital samples 446 is provided to an equalizer circuit 455 that equalizes digital samples 446 to yield a first equalized output 456. Second sensor signal 403 is amplified by a preamplifier circuit 420 to yield an amplified output 421. Amplified output 421 is amplified by a read channel analog front end 430 to yield a read channel front end output 431. Read channel front end output 431 is converted to a second series of digital samples 441 by an analog to digital converter circuit 440. The second series of digital samples 441 is provided to an equalizer circuit 450 that equalizes digital samples 441 to yield a second equalized output 451.

First equalized output 456 and second equalized output 451 are provided to an equalized output combining circuit 460. Equalized output combining circuit 460 is operable to combine first equalized output 456 and second equalized output 451 to yield a unified data output 461. Any approach for combining the input signals to yield unified data output 461 may be used in relation to different embodiments of the present invention. As one example, equalized output combining circuit 460 may compare instances of first equalized output 456 and second equalized output 451 to threshold values. Where both the instance of first equalized output 456 and the instance of second equalized output 451 are outside the thresholds, the value of the two instances are averaged to yield a unified instance. Alternatively, where only the instance of first equalized output 456 or the instance of second equalized output 451 is outside of the thresholds, then that instance is accepted as the unified instance. As yet another example, the sum of first equalized output 456 and second equalized output 451 is used to yield a unified instance. All of the unified instances are then combined to yield unified data output 461. Based upon the disclosure provided herein, one of ordinary skill in the art will recognize a variety of approaches that may be used to combine first equalized output 456 and second equalized output 451 to yield unified data output 461 in accordance with different embodiments of the present invention.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for multi-resolution data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for manufacturing a head assembly, the method comprising:

providing a sensor pair including a first sensor and a second sensor, wherein the first sensor exhibits a first resolution offset from a second resolution exhibited by the second sensor;

sensing data from a storage medium using the first sensor to yield a first signal and sensing data from a storage medium using the second sensor to yield a second signal;

combining a first input derived from the first signal with a second input derived from the second signal to yield a unified data output; wherein combining the first input with the second input includes:

comparing a first instance of the first input with a threshold window;

comparing a second instance of the second input with the threshold window;

averaging the first instance with the second instance to yield a corresponding instance of the unified data output when both the first instance and the second instance are outside the threshold window;

selecting the first instance as the corresponding instance of the unified data output when the first instance is outside the threshold window and the second instance is within of the threshold window; and selecting the second instance as the corresponding instance of the unified data output when the second instance is outside the threshold window and the first instance is within of the threshold window.

2. The method of claim 1, wherein the first resolution is a low resolution and wherein the second resolution is a high resolution, wherein the low resolution exhibits a transfer function that is low-pass in nature, and wherein the high resolution exhibits a transfer function that is high-pass in nature.

3. The method of claim 1, the method further comprising: disposing the head assembly over a track of a storage medium, wherein a down track direction is a direction the head assembly moves in relation to the storage medium during an access of the storage medium; and wherein the physical layout of the first sensor and the second sensor is selected from a group consisting of: the first sensor leads the second sensor in the down track direction, and the second sensor leads the first sensor in the down track direction.

4. The method of claim 1, wherein the first sensor is separated in a horizontal direction from the second sensor by a shield.

5. The method of claim 4, wherein the first sensor is offset above the second sensor in a vertical direction, wherein the vertical direction is substantially perpendicular to the horizontal direction.

6. The method of claim 4, wherein the first sensor is offset of the second sensor in a vertical direction, wherein the vertical direction is substantially perpendicular to the horizontal direction.

7. The method of claim 4, wherein the first sensor is aligned with the second sensor in a vertical direction, wherein the vertical direction is substantially perpendicular to the horizontal direction.

8. A method for accessing data from a storage device, the method comprising:

sensing data from a storage medium using a first sensor to yield a first signal;

sensing data from a storage medium using a second sensor to yield a second signal, wherein a first resolution of the first sensor is offset from a second resolution of the second sensor; and combining a first input derived from the first signal with a second input derived from the second signal without compensating for a difference between the first resolution and the second resolution to yield a unified data output; and wherein combining the first input with the second input includes:

comparing a first instance of the first input with a threshold window;

comparing a second instance of the second input with the threshold window;

averaging the first instance with the second instance to yield a corresponding instance of the unified data output when both the first instance and the second instance are outside the threshold window;

selecting the first instance as the corresponding instance of the unified data output when the first instance is outside the threshold window and the second instance is within of the threshold window; and selecting the second instance as the corresponding instance of the unified data output when the second instance is outside the threshold window and the first instance is within of the threshold window.

9. The method of claim 8, wherein the first signal is processed by a first processing path circuit to yield the first input, wherein the second signal is processed by a second processing path circuit to yield the second input.

10. The method of claim 9, wherein the first processing path circuit and the second processing path circuit are implemented using the same circuit architecture.

11. The method of claim 10, wherein the circuit architecture includes:

a preamplifier circuit operable to amplify an input to yield an amplified output;

a front end circuit operable to filter the amplified output to yield a filtered output;

an analog to digital converter circuit operable to generate a series of digital samples corresponding to the filtered output; and an equalizer circuit operable to equalize the series of digital samples to yield an equalized output.

12. A hard disk drive, the hard disk drive comprising:

a disk platter including a track of information;

a head assembly disposed in relation to the disk platter, wherein the head assembly includes at least a first sensor and a second sensor, wherein the first sensor exhibits a first resolution, and wherein the second sensor exhibits a second resolution offset from the first resolution; and a read circuit operable to:

receive a first signal from the first sensor and a second signal from the second sensor, and combine the first signal and the second signal without compensating for a difference between the first resolution and the second resolution to yield a unified data output, wherein combining the first signal with the second signal includes:

generating a first input corresponding to the first signal;

generating a second input corresponding to the second signal;

comparing a first instance of the first input with a threshold window;

comparing a second instance of the second input with the threshold window;

averaging the first instance with the second instance to yield a corresponding instance of the unified data output when both the first instance and the second instance are outside the threshold window;

selecting the first instance as the corresponding instance of the unified data output when the first instance is outside the threshold window and the second instance is within of the threshold window; and selecting the second instance as the corresponding instance of the unified data output when the second instance is outside the threshold window and the first instance is within of the threshold window.

13. The hard disk drive of claim 12, wherein the read circuit is implemented as part of an integrated circuit.

14. The hard disk drive of claim 12, wherein both the first sensor and the second sensor sense the information from the track.

15. The hard disk drive of claim 12, wherein the disk platter is a magnetic storage medium.

16. The hard disk drive of claim 15, wherein the information is magnetic information.

17. The hard disk drive of claim 12, wherein the head assembly is operable to move in relation to the disk platter in a down track direction, and wherein a cross track direction is substantially perpendicular to the down track direction.

18. The hard disk drive of claim 17, wherein the first sensor is offset to the right of the second sensor in the cross track direction.

19. The hard disk drive of claim 17, wherein the first sensor is offset to the left of the second sensor in the cross track direction.

20. The hard disk drive of claim 17, wherein the first sensor is aligned with the second sensor in the cross track direction.

21. The hard disk drive of claim 12, wherein the first resolution is lower than the second resolution.

22. The hard disk drive of claim 12, wherein the first resolution is a low resolution and wherein the second resolution is a high resolution, wherein the low resolution exhibits a transfer function that is low-pass in nature, and wherein the high resolution exhibits a transfer function that is high-pass in nature.

23. The hard disk drive of claim 22, wherein the first sensor leads the second sensor in the down track direction.

24. The hard disk drive of claim 22, wherein the second sensor leads the first sensor in the down track direction.

25. The hard disk drive of claim 12, wherein the read circuit includes: a first processing path circuit operable to process the first signal to yield a first input and a second processing path circuit operable to process the second signal to yield a second input, wherein the first processing path circuit and the second processing path circuit are implemented using the same circuit architecture.

26. The hard disk drive of claim 25, wherein the circuit architecture includes:
- a preamplifier circuit operable to amplify an input to yield an amplified output;
- a front end circuit operable to filter the amplified output to yield a filtered output;
- an analog to digital converter circuit operable to generate a series of digital samples corresponding to the filtered output; and
- an equalizer circuit operable to equalize the series of digital samples to yield an equalized output.

* * * * *